(12) United States Patent
Prentice et al.

(10) Patent No.: US 11,551,244 B2
(45) Date of Patent: Jan. 10, 2023

(54) NOWCASTING ABSTRACTED CENSUS FROM INDIVIDUAL CUSTOMS TRANSACTION RECORDS

(71) Applicant: Panjiva, Inc., New York, NY (US)

(72) Inventors: Jason Seth Prentice, Arlington, MA (US); Peter Goodings Swartz, Cambridge, MA (US); James Ryan Psota, Cambridge, MA (US)

(73) Assignee: Panjiva, Inc., New York, NY (US)

( * ) Notice: Subject to any disclaimer, the term of this patent is extended or adjusted under 35 U.S.C. 154(b) by 780 days.

(21) Appl. No.: 15/960,412

(22) Filed: Apr. 23, 2018

(65) Prior Publication Data

US 2018/0308112 A1    Oct. 25, 2018

Related U.S. Application Data

(60) Provisional application No. 62/488,730, filed on Apr. 22, 2017.

(51) Int. Cl.
*G06Q 30/02* (2012.01)
*G06N 3/08* (2006.01)
(Continued)

(52) U.S. Cl.
CPC ..... *G06Q 30/0202* (2013.01); *G06F 16/2246* (2019.01); *G06F 16/2365* (2019.01);
(Continued)

(58) Field of Classification Search
CPC ............... G06Q 30/00; G06Q 30/0202; G06Q 10/06313; G06Q 10/0637; G06N 3/08;
(Continued)

(56) References Cited

U.S. PATENT DOCUMENTS

| | | |
|---|---|---|
| 5,570,291 A | 10/1996 | Dudle et al. |
| 5,826,244 A | 10/1998 | Huberman |

(Continued)

FOREIGN PATENT DOCUMENTS

| | | |
|---|---|---|
| CN | 1499403 A | 5/2004 |
| CN | 1822000 A | 8/2006 |

(Continued)

OTHER PUBLICATIONS

Jesse Farmer, "Interview Questions: Database Indexes", (May 14, 2008), http://20bits.com/article/interview-questions-database-indexes (Year: 2008).*

(Continued)

*Primary Examiner* — Timothy Padot
*Assistant Examiner* — Reham K Abouzahra
(74) *Attorney, Agent, or Firm* — Yee & Associates, P.C.

(57) ABSTRACT

A signal relationship is defined between a granular data value and a target data value. At least a portion of the granular data value corresponds to a granular latency value that is smaller than a target data latency value corresponding to the target data value. Granular data corresponding to the granular data value is interpreted. The granular data is aggregated in response to the signal relationship. A value of the target data value for a selected time reference is estimated, and the estimated value of the target data value is provided as a nowcasting prediction of the target data value.

19 Claims, 5 Drawing Sheets

(51) Int. Cl.
  *G06N 5/02* (2006.01)
  *G06F 16/25* (2019.01)
  *G06F 16/22* (2019.01)
  *G06F 16/23* (2019.01)
  *G06Q 10/06* (2012.01)

(52) U.S. Cl.
  CPC ............. *G06F 16/258* (2019.01); *G06N 3/08* (2013.01); *G06N 5/022* (2013.01); *G06Q 10/0637* (2013.01); *G06Q 10/06313* (2013.01)

(58) Field of Classification Search
  CPC ... G06N 5/022; G06F 16/2246; G06F 16/258; G06F 16/2365
  USPC ...................................................... 705/7.35
  See application file for complete search history.

(56) References Cited

U.S. PATENT DOCUMENTS

| | | | |
|---|---|---|---|
| 5,970,475 A | 10/1999 | Barnes et al. | |
| 5,987,429 A | 11/1999 | Maritzen et al. | |
| 6,035,017 A | 3/2000 | Fenton et al. | |
| 6,112,181 A * | 8/2000 | Shear | G06Q 30/06 705/7.29 |
| 6,629,081 B1 | 9/2003 | Cornelius et al. | |
| 7,330,833 B1 | 2/2008 | Robb et al. | |
| 7,610,233 B1 | 10/2009 | Leong et al. | |
| 7,617,136 B1 | 11/2009 | Lessing et al. | |
| 7,912,865 B2 | 3/2011 | Akerman et al. | |
| 8,423,425 B2 * | 4/2013 | Psota | G06Q 40/02 705/347 |
| 8,473,354 B2 | 6/2013 | Psota et al. | |
| 9,519,859 B2 | 12/2016 | Huang et al. | |
| 9,639,874 B2 | 5/2017 | Psota et al. | |
| 2001/0056379 A1 | 12/2001 | Fujinaga et al. | |
| 2002/0194050 A1 | 12/2002 | Nabe et al. | |
| 2003/0034879 A1 | 2/2003 | Rangarajan et al. | |
| 2003/0046220 A1 | 3/2003 | Kamiya | |
| 2003/0088562 A1 | 5/2003 | Dillon et al. | |
| 2003/0126146 A1 | 7/2003 | Van Der Riet | |
| 2003/0187716 A1 | 10/2003 | Lee | |
| 2003/0212609 A1 | 11/2003 | Blair et al. | |
| 2004/0039598 A1 | 2/2004 | Kim | |
| 2004/0109543 A1 | 6/2004 | Engelsma et al. | |
| 2004/0122942 A1 | 6/2004 | Green et al. | |
| 2004/0143600 A1 | 7/2004 | Musgrove et al. | |
| 2004/0148217 A1 * | 7/2004 | Lauring | G06Q 10/08 705/7.33 |
| 2004/0162742 A1 | 8/2004 | Stoker et al. | |
| 2004/0236666 A1 | 11/2004 | Clark et al. | |
| 2004/0243503 A1 | 12/2004 | Eng et al. | |
| 2005/0021527 A1 | 1/2005 | Zhang et al. | |
| 2005/0144052 A1 | 6/2005 | Harding et al. | |
| 2006/0136237 A1 * | 6/2006 | Spiegel | G06Q 10/0835 705/13 |
| 2007/0112671 A1 | 5/2007 | Rowan | |
| 2007/0239577 A1 | 10/2007 | Grody et al. | |
| 2007/0260521 A1 | 11/2007 | Van Der Riet | |
| 2008/0040329 A1 | 2/2008 | Cussen et al. | |
| 2008/0082528 A1 | 4/2008 | Bonzi et al. | |
| 2008/0120129 A1 | 5/2008 | Seubert et al. | |
| 2008/0162297 A1 | 7/2008 | Hershkovitz et al. | |
| 2008/0162347 A1 | 7/2008 | Wagner | |
| 2009/0144070 A1 | 6/2009 | Psota et al. | |
| 2009/0234814 A1 | 9/2009 | Boerries et al. | |
| 2009/0326995 A1 | 12/2009 | Sorisi et al. | |
| 2010/0094840 A1 | 4/2010 | Donnelly | |
| 2011/0098846 A1 * | 4/2011 | Yeung | B07C 3/12 700/226 |
| 2011/0137705 A1 | 6/2011 | Srinivasan | |
| 2011/0173093 A1 | 7/2011 | Psota et al. | |
| 2012/0191619 A1 | 7/2012 | Gross | |
| 2012/0203708 A1 | 8/2012 | Psota et al. | |
| 2012/0278399 A1 | 11/2012 | Turner et al. | |
| 2013/0073464 A1 | 3/2013 | Magpayo et al. | |
| 2013/0268403 A1 | 10/2013 | Psota et al. | |
| 2013/0317954 A1 | 11/2013 | Psota et al. | |
| 2014/0095353 A1 | 4/2014 | Psota et al. | |
| 2014/0136440 A1 * | 5/2014 | Ahmed | G06Q 10/10 705/342 |
| 2014/0143192 A1 | 5/2014 | Nagakura | |
| 2014/0156513 A1 | 6/2014 | Psota et al. | |
| 2014/0258032 A1 | 9/2014 | Psota et al. | |
| 2014/0278804 A1 * | 9/2014 | Lanxner | G06Q 30/0206 705/7.35 |
| 2015/0073929 A1 | 3/2015 | Psota et al. | |
| 2015/0317589 A1 * | 11/2015 | Anderson | G06N 20/20 705/7.25 |
| 2015/0347941 A1 * | 12/2015 | Yund, IV | G06Q 10/06312 705/7.22 |
| 2016/0357828 A1 * | 12/2016 | Tobin | G06F 16/248 |
| 2017/0091320 A1 | 3/2017 | Psota et al. | |
| 2018/0060829 A1 * | 3/2018 | Gillen | G06Q 10/083 |

FOREIGN PATENT DOCUMENTS

| | | |
|---|---|---|
| EP | 2212839 A4 | 6/2012 |
| EP | 2524299 A1 | 11/2012 |
| JP | H11160454 A | 6/1999 |
| KR | 20160022540 A | 3/2016 |
| WO | 2009065029 A1 | 5/2009 |
| WO | 2011085360 A1 | 7/2011 |
| WO | 2014146193 A1 | 9/2014 |

OTHER PUBLICATIONS

Taylor Kenneth, "Data Model Generation Using Generative Adversarial Networks and Fully Automated Machine Learning System Which Generates and Optimizes Solutions Given a Dataset and a Desired Outcome", European Patent Office. (Year: 2019).*
Bilenko, et al., "Adaptive duplicate detection using learnable string similarity measures", Internet Citation, Aug. 2003 (Aug. 2003), XP002475117, Retrieved from the Internet: URL:http://citeseer.ist.psu.edu/bilenko03adaptive.html [retrieved on Apr. 4, 2008], Aug. 2003, 10 pages.
China Patent Office, "Application Serial No. CN200880124775.2, English and Chinese Translations, First Office Action dated Jul. 13, 2011", 19 pages.
China Patent Office, "Chinese Application No. 200880124775.2, Second Office Action dated Aug. 3, 2012", English translation and Chinese Translations, 13 pages.
China Patent Office, "Application Serial No. CN200880124775.2, English and Chinese Translations, Third Office Action dated Apr. 2, 2013", 7 pages.
China Patent Office, "Chinese Application Serial No. 200880124775.2, Fourth Office Action dated Feb. 8, 2014", English and Chinese Translations, 17 pages.
China Patent Office, "Chinese Application No. 200880124775.2, Fifth Office Action dated Sep. 25, 2014", Chinese and English translations, 7 pages.
China Patent Office, "Chinese Application No. 201180013496.0, First Office Action dated Dec. 3, 2014", English and Chinese Translations, 19 Pages.
CIPO, "Application Serial No. 2,742,395, 1st Office Action dated Feb. 18, 2015", 4 pages.
CIPO, "CA Application No. 2,742,395 Office Action dated Nov. 10, 2015", 3 pages.
Elmagarmid, AK. et al., "Duplicate Record Detection: A Survey", IEEE Transactions on Knowledge and Data Engineering, IEEE Service Center, Los Alamitos, CA, US, XP011151234, ISSN: 1041-4347 vo 1. 18, No. 1, Jan. 1, 2007, pp. 1-16.
EPO, "EP Application Serial No. 08850236.4, European Office Action dated Nov. 4, 2014", 6 pages.
EPO, "EP Application Serial No. 08850236.4, European Search Report dated May 21, 2012", 7 pages.
EPO, "EP Application Serial No. 11732308.9, European Search Report dated Oct. 11, 2013", 3 pages.
Garcia, SM. et al., "Imnunization 1-15 Registries DeDuplication

(56) References Cited

OTHER PUBLICATIONS and Record Matching", Internet Citation—Retrieved from the Internet: URL:www.imnunizationregistries.comjwhite papersj-WHP006A deduplication recordmatching.pdf [retrieved on Oct. 27, 2003], 1999, 12 pages.

Mooney M, R J. et al., "Adaptive duplicate detection using learnable string similarity measure", Internet Citation, Aug. 2003 (Aug. 2003), XP002475117. Retrieved from the Internet: URL:http://citeseer.ist.psu.edu/bilenko03a daptive.html [retrieved on Apr. 4, 2008], Aug. 2003, 10 pages.

"The Four Challenges of Customer-Centric Data Warehousing", Internet Citation—XP002259648, Retrieved from the Internet: URL:http://www.ctiforum.com/technology/CRM jwhitepaperjdwo.pdf [retrieved on Oct. 27, 2003], Nov. 1998, 16 pages.

"U.S. Appl. No. 12/271,593, Non-Final Office Action dated Oct. 14, 2010", 7 pages.

"U.S. Appl. No. 12/271,593, Final Office Action dated May 16, 2011", 11 pages.

"U.S. Appl. No. 12/271,593, Notice of Allowance dated May 11, 2012", 8 pages.

"U.S. Appl. No. 12/271,593, Notice of Allowance dated May 1, 2013", 20 pages.

"U.S. Appl. No. 13/004,368, Non-Final Office Action dated Apr. 27, 2012", 12 pages.

"U.S. Appl. No. 13/004,368, Notice of Allowance dated Jan. 8, 2013", 15 pages.

"U.S. Appl. No. 13/343,354. Notice of Publication", Aug. 9, 2012, 1 page.

"U.S. Appl. No. 13/343,354, Non-Final Office Action dated Mar. 15, 2013", 14 pages.

"U.S. Appl. No. 13/343,354, Notice of Allowance dated Sep. 6, 2013", 19 pages.

"U.S. Appl. No. 13/790,049, Non-Final Office Action dated Sep. 12, 2014", 18 pages.

"U.S. Appl. No. 13/790,049, Non-Final Office Action dated Jan. 23, 2015", 13 pages.

"U.S. Appl. No. 13/790,049, Final Office Action dated Jul. 10, 2015", 15 pages.

"U.S. Appl. No. 13/906,007, Non-Final Office Action dated Oct. 20, 2014", 7 pages.

"U.S. Appl. No. 13/906,007, Final Office Action dated Mar. 27, 2015", 12 pages.

"U.S. Appl. No. 14/096,662, Non-Final Office Action dated Feb. 13, 2015", 20 pages.

"U.S. Appl. No. 14/096,662, Final Office Action dated Oct. 1, 2015", 22 pages.

"U.S. Appl. No. 14/097,474, Non-Final Office Action dated Feb. 2, 2015", 23 pages.

"U.S. Appl. No. 14/097,474, Final Office Action dated Sep. 15, 2015", 12 pages.

"U.S. Appl. No. 14/205,058, Non-Final Office Action dated Jan. 28, 2015", 17 pages.

"U.S. Appl. No. 14/488,401, Non-Final Office Action dated Jan. 15, 2015", 17 pages.

"U.S. Appl. No. 14/488,401, Final Office Action dated Jun. 18, 2015", 17 pages.

WIPO, "International Application Serial No. PCT/US2008/083623, Search Report and Written Opinion dated Apr. 16, 2009", 12 pages.

WIPO, "International Application Serial No. PCT/US2011/20807, Search Report and Written Opinion dated Apr. 20, 2011", 10 pages.

Huang et al.; "Learning Deep Structured Semantic Models for Web Search using Clickthrough Data;" ACM International Conference on Information and Knowledge Management (CIKM); Oct. 27-Nov. 1, 2013; San Francisco, CA; 6 pages.

\* cited by examiner

NOWCASTING ABSTRACTED CENSUS FROM INDIVIDUAL CUSTOMS TRANSACTION RECORDS

CROSS REFERENCE TO RELATED APPLICATION

This application claims the benefit of and priority under 35 U.S.C. § 119(e) to U.S. Provisional Patent Application No. 62/488,730, filed Apr. 22, 2017, the entire contents of which are incorporated herein by reference.

TECHNICAL FIELD

This application generally relates to systems, methods, and apparatuses, including computer program products, for predictive analysis, and in particular, to systems, methods, and apparatuses for simultaneous, hierarchical aggregation of transaction-level records.

BACKGROUND

Predictive analytics is used prevalently in several fields of commerce to make predictions about future behavior patterns or events based on historical data. For example, predictive analytics can be used to analyze and predict import and export activity based on shipping records and census data. However, determining import-related data into a specific country presents a number of challenges. Data reporting from agencies have built in time delays, which vary with the type of data being reported. Additionally, reported data may be incomplete, redacted, and/or have errors. For example, shipping weight data is often reported at a lower value than the actual shipping weight. Further, one or more data elements on the shipping records are often redacted or missing. In yet another example, shipping data may be delayed several days or weeks, and the delay of certain types of data (e.g., individual shipping records) may have a different delay period than other types of data (e.g., census statistics).

Accordingly, challenges are presented in understanding the actual imports into a country, the import categories and amounts, and the overall imports coming from countries of interest.

SUMMARY

There is therefore a need for systems, methods, and apparatuses for accurately predicting import information based on a time scale of the recent past, the present, and/or the near future, or further in the future. This information is important for a number of industries such as economic planning, investment decisions, and/or logistical planning.

The technology, in one aspect, features a method. A signal relationship is defined between a granular data value and a target data value. At least a portion of the granular data value corresponds to a granular latency value that is smaller than a target data latency value corresponding to the target data value. Granular data corresponding to the granular data value is interpreted. The granular data is aggregated in response to the signal relationship. A value of the target data value for a selected time reference is estimated, and the estimated value of the target data value is provided as a nowcasting prediction of the target data value.

The technology can include any of the following features. In some embodiments, aggregating the granular data includes aggregating the granular data value in a hierarchical format. In some embodiments, the granular data is processed prior to the aggregating. In some embodiments, the processing can further include indexing the granular data in response to the hierarchical format. In some embodiments, the processing further includes indexing the granular data in response to the signal relationship. In some embodiments, the processing can further include verifying the signal relationship in response to at least one sub-aggregation developed during the aggregating. In some embodiments, the processing can further include completing gaps in the granular data. In some embodiments, the processing can further include correcting erroneous data in the granular data.

In some embodiments, estimating further includes applying a time series transformation to the granular data based on the selected time reference. In some embodiments, applying the time series transformation further includes performing one or more of a differencing operation, a conversion to percent change, convolutional filtering, trend regression, cycle regression, a power transform, and a smoothing operation.

In some embodiments, estimating further includes applying a machine learning model to an output of the time series transformation. In some embodiments, applying the machine learning model further includes performing one or more of a linear regression, a regularized regression, applying a support vector machine, a tree-based method, applying a neural network, determining a time domain distribution, and determining a convergence in multiple dimensions.

In some embodiments, a hierarchical relationship between at least two data fields of the granular data is identified. In some embodiments, identifying the hierarchical relationship further includes receiving a data structure defining the hierarchical relationship between the at least two data fields of the granular data.

In some embodiments, a value of the target data value for the selected time reference is weighted. In some embodiments, weighting includes performing one or more of a linear regression, a regularized regression, applying a support vector machine, a tree-based method, applying a neural network, determining a time domain distribution, and determining a convergence in multiple dimensions.

In some embodiments, a change in at least one data field of the granular data is correlated with a change in the target data value.

In some embodiments, a cached data structure is generated based on an aggregation of the granular data. The cached data structure includes a plurality of data fields extracted from the granular data. In some embodiments, an index is generated based on at least two data fields extracted from the aggregation of the granular data.

Other aspects and advantages of the invention will become apparent from the following detailed description, taken in conjunction with the accompanying drawings, illustrating the principles of the invention by way of example only

BRIEF DESCRIPTION OF THE FIGURES

The disclosure and the following detailed description of certain embodiments thereof may be understood by reference to the following figures.

DETAILED DESCRIPTION

Figure 1:
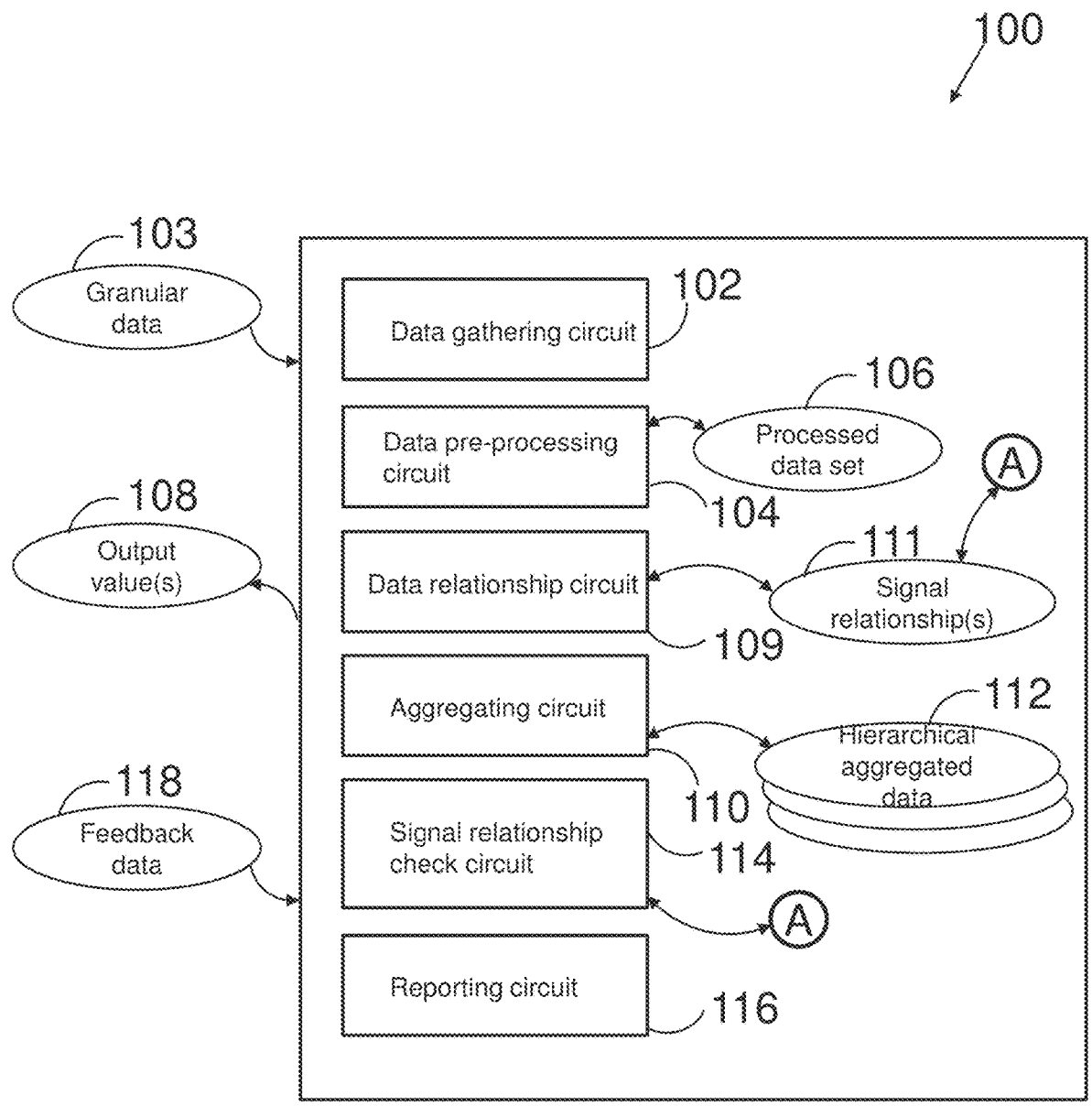
FIG. 1 depicts a block diagram of methods and systems of nowcasting described herein.

The term "nowcasting," as utilized herein, should be understood broadly. Nowcasting references understanding import information up to the recent past (e.g., 1 week in the past, 2 weeks in the past, 1 month in the past, and/or further back in the past), to the present (e.g., today, and/or at a next reporting interval), or the near-term future (e.g., at a specified reporting date such as an approaching 15th or 30th of a month, 2 weeks forward, 1 month forward, 2 months forward, 1 year forward, forward to a seasonal date of interest, and/or forward to a date of interest specific to a particular industry, company, or country). The referenced time frames are non-limiting examples.

An example method for nowcasting a data set, such as import information into a country, includes defining signal relationships between granular data (e.g., specific shipping records) to the desired target data. For example, it may be determined that a group of car import transaction records have a specified relationship to shipments received overall into a country, to shipments sent from a country, and/or to shipments sent from a region (e.g., East Asia, Europe, etc.). Additionally, or alternatively, a group of transaction records may have a specified relationship to deliveries to specific regions within the import country of interest. The relationship between a data set to a value of interest herein is described as a "signal relationship" in certain instances. For example, a basket of transaction records that can be determined to be predictive of shipments from a specific country, region, or product type, can be described as having a signal relationship to those shipments.

In one example, a basket of transaction records by entity, origin, or other defining parameter may be determined to have a signal relationship to an output of interest, such as overall shipments from a country, shipments of a specified type from a country, and/or economic activity of a country. In certain embodiments, a data element such as a transaction record, is determined to be a part of a signal relationship to a number of outputs of interest, and may have a distinct relationship with each output of interest. For example, a data element may have a positive correlation with a first output, such as shipments of interest from a given country, and a negative correlation with a second output, such as total economic activity from a country (e.g., where an industry moves negatively with economic output, is a leading or lagging indicator of economic output, etc.). Additionally, or alternatively, the signal relationship between a data element and an output of interest can vary with the nowcasting time scale—for example a given transaction may correlate to an increase in current shipments, and a decrease in future shipments at certain time scales. Signal relationships may be determined on raw data (e.g., shipment volumes), processed data (e.g., the rate of change, frequency components, integrations, etc.), and/or utilizing other information to determine the signal relationships. Other information can include, without limitation, normalized values for data (e.g., the range of a data value ordinarily observed or known to be present such as capacities, volatility of the data, manufacturing utilization of a product, etc.). In certain embodiments, other information includes other economic indicators (e.g., jobs reports, economic output of selected countries or industries, commodity prices, inflation reporting, etc.) and/or news events (e.g., specific announcements such as from OPEC or other industry groups, any events correlated with economic indications based on historical observation).

The example method further includes aggregating granular information (e.g., shipping transactions and/or customs records) in a hierarchical format. For example, granular information may be aggregated by country, then aggregated by region, and then aggregated into a full data set. The hierarchical aggregation allows for faster processing in parallel, providing for a more rapid solution with a given amount of processing power for a computer. Additionally, or alternatively, the hierarchical aggregation allows for additional correlations to be determined and/or checked, providing for both a more accurate answer (e.g., checking countries or regions that move together in a known or observed manner) and efficiently determining where errors are likely to be propagated and more efficiently update the signal relationships. For example, if China and Korea electronic exports to the U.S. have a known relationship, a check on the aggregation data for China and Korea can provide a rapid detection of an anomaly in Korea electronic shipment data, allowing for additional processing to check signal relationships for Korea data, without waiting for the fully aggregated data set to show an anomaly (longer delay time to detect the anomaly) and then have to determine where the anomaly occurs within the data set (lack of guidance to identify the anomalous input data).

Additionally, or alternatively, the hierarchical aggregation allows for efficient processing of the granular data before the nowcasting is performed. For example, granular data such as shipping records can be indexed based upon the aggregation parameters before the nowcasting is performed, allowing for more rapid execution of the nowcasting, reduced communication bandwidth usage, and reduced memory usage, as only the relevant data at each aggregation level needs to be processed, communicated, and/or stored on the applicable computing resources.

In certain embodiments, the hierarchical aggregation provides for checks and additional signal relationship determination in an orthogonal (or at least partially orthogonal) dimension. For example, aggregation from country to region provides for improved accuracy and efficiency as described preceding, but the data is not independent as it is aggregated in a parallel dimension. In certain embodiments, signal relationships by industry, port, shipping entity, product values, and/or aggregate shipping weights provide for orthogonal data which can be utilized to develop higher confidence in the aggregated outputs. Where indexing of granular data is performed, in certain embodiments the indexing is performed in consideration of any or all aggregating dimensions.

An example method further includes providing output data that includes nowcasting of total imports and/or exports into the country of interest (allowing, e.g., determination of a trade deficit, port utilization, etc.), activity at a port of interest, shipments to regions of interest, supply chain performance of a company of interest (e.g., either the executor of shipments of interest, and/or the recipient of one or more baskets of shipments of interest), estimation of inventories for industries or entities of interest, and/or ancillary imports or exports. For example, where the granular data involves maritime shipping data, correlations to air freight data can be utilized to determine air freight based imports, exports, or internal activity to a country of interest. An example includes tracking a historical relationship between air freight and maritime freight, which may further include a correlation based on the industry, the value of freight, the weight of freight, and/or trends in a country or industry.

An example method further includes correction of granular data, and/or completion of gaps in granular data. For example, historical shipping information and/or correlations from other fields of data can determine missing information in a granular data record, such as the shipping entity, value, or other information. In another example, historical information on weights versus reported weights can be utilized to correct systematic or individual errors in shipping weight data.

Error detection and correction techniques for transaction data are described in U.S. Pat. No. 9,898,767 (hereinafter "the '767 patent"), filed Sep. 17, 2014 and entitled "Transaction Facilitating Marketplace Platform," the entire contents of which are hereby incorporated herein by reference. The '767 patent describes techniques including triangulation, by which both public (e.g., customs) and private (e.g., third-party) records are used to determine shipping weight data error correction, value correction, size correction and the like. Techniques described in the '767 patent include detecting similarity of public and private transactions records to facilitate determining missing information, such shipper, supplier, buyer, weight, and the like. These techniques may be useful for records with incomplete data independent of the cause of the missing data; however even intentional redaction may be overcome.

U.S. application Ser. No. 15/254,714 (hereinafter "the '714 application"), filed Sep. 1, 2016 and entitled "Natural Language Processing For Entity Resolution," the entire contents of which are hereby incorporated herein by reference, provides additional techniques for correcting data errors, such as missing data and the like. One such technique is the use of Natural Language Processing (NLP) to facilitate language-agnostic processing of free text fields of shipment records. Such processing may facilitate validating user-specified declaration of shipment value, weight, and the like. Such techniques may also utilize categorization of granular shipment records into Harmonized Tariff Schedule (HTS) to further validate shipment information. This may be effectuated through a variety of approaches, including a self-updating matrix that maps HTS category and value to weight, volume, and the like. Additionally, the '714 application describes similarity-matching natural language processing that performs learning and/or term frequency calculations that may facilitate granular record validation, correction, or missing information determination. The '714 application also provides n-gram and vector-based similarity determination techniques for facilitating correlation of granular transaction records that may enable validation, correction, or determining of missing data.

An example method further includes updating signal relationships over time, for example where correlations between granular data, country aggregation data, regional aggregation data, and/or industry aggregation data change over time. In a further embodiment, cyclical and/or long-term trend changes in correlations may be detected and utilized in determining changes in signal relationships over time. For example, where an industry shows cyclical behavior, the signal relationship can be changed depending upon where in the cycle the nowcasting is being performed. In another example, a longer-term trend in the signal relationship is observed, and the trend can be applied, alternatively or in addition to a cyclical correction, to the nowcasting according to the time frame that the nowcasting is determining the output data.

An example method includes updating multiple signal relationships to converge on a solution for the output data and/or the signal relationships. For example, where a given nowcasting event predicted total imports to the U.S. well based upon later published data, but the nowcasting event did not provide an accurate result for oil imports or car imports, the signal relationships for one or more aggregating dimensions are tuned to provide a more accurate result for the individual results as well as maintaining the overall prediction. Accordingly, the use of multiple dimensions of signal relationships allows for greater confidence that a future prediction will be correct, and updating of the system knowledge even where a given prediction was accurate.

An example method includes utilizing granular data having distinct time scales, and modeling the signal relationships between data and the output to match the time scales. For example, where one data element has a 1-week lag time, and another data element has a 3-week lag time, the method includes predicting the value of the 3-week lag time data at a 1-week delay, and then correlating the data elements to determine an aggregated value at a time of interest. The method describes bringing lagged data forward, although any reference time may be utilized, including bringing the 1-week data back before predicting forward, or selecting another time reference and adjusting data elements to the selected time reference. In certain embodiments, the selected time reference is an optimizing parameter which can be adjusted, including cyclically and/or on a trend, for example according to the timing at which the underlying data sets are most accurate and/or up-to-date.

Referencing FIG. 1, an example system 100 is depicted. The example system 100 is structured to perform any one or more operations of the method described herein. The example system 100 includes a data gathering circuit 102 that interprets granular data 103, such as shipping records. The example system further includes a data pre-processing circuit 104 that provides a processed data set 106, where the processed data set is indexed in one or more aggregation dimensions, and/or that has data gaps completed on the granular data. In certain embodiments, the data pre-processing circuit 104 additionally corrects one or more aspects of the granular data, such as shipping weights, entity names, and/or countries of origin. Techniques for pre-processing granular transaction records, such as to correct one or more aspects of granular data are described in the '767 patent and the '714 application. Techniques described in the '767 patent include triangulation, such as by using both public (e.g., customs) and private (e.g., third-party) records to determine shipping weight data error correction value correction, size correction and the like. Techniques described in the '767 patent include detecting similarity of public and private transactions records to facilitate determining missing information, such shipper, supplier, buyer, weight, and the like. These techniques may be useful for records with incomplete data independent of the cause of the missing data; however even intentional redaction may be overcome.

The '714 application provides additional techniques for correcting data errors, such as missing data and the like. One such technique is the use of Natural Language Processing (NLP) to facilitate language-agnostic processing of free text fields of shipment records. Such processing may facilitate validating user-specified declaration of shipment value, weight, and the like. Such techniques may also utilize categorization of granular shipment records into Harmonized Tariff Schedule (HTS) to further validate shipment information. This may be effectuated through a variety of approaches, including a self-updating matrix that maps HTS category and value to weight, volume, and the like. Additionally, the '714 application describes similarity-matching natural language processing that performs learning and/or term frequency calculations that may facilitate granular record validation, correction, or missing information determination. The '714 application also provides n-gram and vector-based similarity determination techniques for facilitating correlation of granular transaction records that may enable validation, correction, or determining of missing data.

The example system further includes a data relationship circuit 109 that defines signal relationships 111 between the granular data 103 and/or the processed data 106 and an output value 108. Example and non-limiting output values include: commodity indices; oil imports and/or exports; car imports and/or exports; aggregate trade indices such as shipping volumes (e.g., twenty-foot equivalent unit), import or export total monetary values, and/or trade deficits; aggregate country level indicators; aggregate regional level indicators; company values and/or volumes; port values and/or volumes; combinations of any of the foregoing; and/or industry specific aspects of any of the foregoing. Further example and non-limiting output values 108 include: total imports and/or exports into the country of interest (allowing, e.g., determination of a trade deficit, port utilization, etc.), activity at a port of interest, shipments to regions of interest, supply chain performance of a company of interest (e.g., either the executor of shipments of interest, and/or the recipient of one or more baskets of shipments of interest), estimation of inventories for industries or entities of interest, and/or ancillary imports or exports. The described example output values are non-limiting examples. The example output values are nowcast values at any selected time reference.

The example system 100 further includes an aggregating circuit 110 that aggregates the granular data 103 and/or processed data 106. An example aggregating circuit 110 aggregates the granular data 103 and/or processed data 106 in a hierarchical format. In the example system 100, three levels of hierarchical aggregated data 112 are depicted, although the aggregation may utilize any number of hierarchical levels, including parallel hierarchy branches (e.g., geographical hierarchy in a first branch, and sub-industry/industry hierarchy in a second branch). For example, granular information may be aggregated by country, then aggregated by region, and then aggregated into a full data set. In certain embodiments, the aggregating circuit 110 utilizes multiple processors and/or processing cores to aggregate data in a parallel processing operation (e.g., aggregating a first country or first set of countries on a first processing resource, and aggregating a second country or second set of countries on a second processing resource).

The example system 100 further includes a signal relationship check circuit 114 that determines an accuracy value of the output value 108 in response to the signal relationships 111 and the aggregated data 112. For example, the signal relationship check circuit 114 ensures that each aggregated data 112 value is within expected ranges, and/or shows relationships consistent with predetermined signal relationships 111. In some embodiments, predetermined signal relationships 111 are based on known relationships between the data contained in certain transaction records and the output(s) that data is useful for predicting.

The example signal relationship check circuit 114 determines the output value 108 in response to the signal relationships 111 and the aggregated data 112, and/or updates the signal relationships 111 where the aggregated data 112, combined with previous data and/or data trends, indicates that a signal relationship 111 is likely to have changed. In certain embodiments, the data gathering circuit 102 determines feedback data 118 (e.g., a census report available at a later time relative to the output value 108 determination), and the signal relationship check circuit 114 further updates the signal relationship 111 in response to the feedback data 118.

An example system 100 includes a reporting circuit 116 provides the output value 108, where the output value 108 includes nowcasting results. The example reporting circuit 116 provides the output value 108 at selected time intervals, for example daily, at selected calendar dates, and/or continuously as the granular data 103 is updated. In certain embodiments, the reporting circuit 116 provides the output value 108 in response to requests from a recipient—for example when certain data aspects are available or have updated (e.g., electronics shipping from Korea), and/or when data trends or thresholds are determined in the output value 108 (e.g., a 10% week-to-week increase in an industry output, a value or volume greater than a threshold, etc.). An example reporting circuit 116 provides the output value 108 as an alert (e.g., a message or application communication to a mobile device, an e-mail, and/or a prominent notification on a website that a parameter of interest may be available), publishes the output value 108 to a website or network location, and/or makes the output value 108 available—such as to an accessible database for one or more users, through an application, and/or as a subscription service. In certain embodiments, the example reporting circuit 116 provides the output value 108 as an authorized user service, where a data recipient logs in to an application, website, or the like, with a username and/or password. A further embodiment of the present disclosure may include that there is a temporal delay between the time of providing the output value and the time of use thereof of long enough duration that the mobile device enters a sleep mode as regards the interaction, and the client device is activated out of sleep mode upon receipt of the alert.

An example system 100 includes the user interaction circuit 116 further providing the notification 108 as an alert that is sent to a mobile device of the user. An example system 100 further includes the notification response value 108 including a notification type value and/or a notification location value. An example notification value includes the alert to be sent to the mobile device, and an example notification location value includes a communication channel to the mobile device of the user. Example and non-limiting communication channels include a user phone number, messaging system username or profile name, and/or a communication application username or profile name. An example alert activates a graphical user interface of the mobile device to cause the alert to display on the mobile device, and to enable connection with the graphical user interface in response to the mobile being activated. In certain embodiments, the alert is capable to wake the device from a sleep mode or deactivated mode. Additionally, or alternatively, the alert is capable to provide the graphical user interface upon an operation of the user or another application waking and/or activating the device. An example graphical user interface provides the user with selected information from all or a portion of the output value 108, and/or provides access to open an application to access the nowcasting results or portions thereof.

Figure 2:
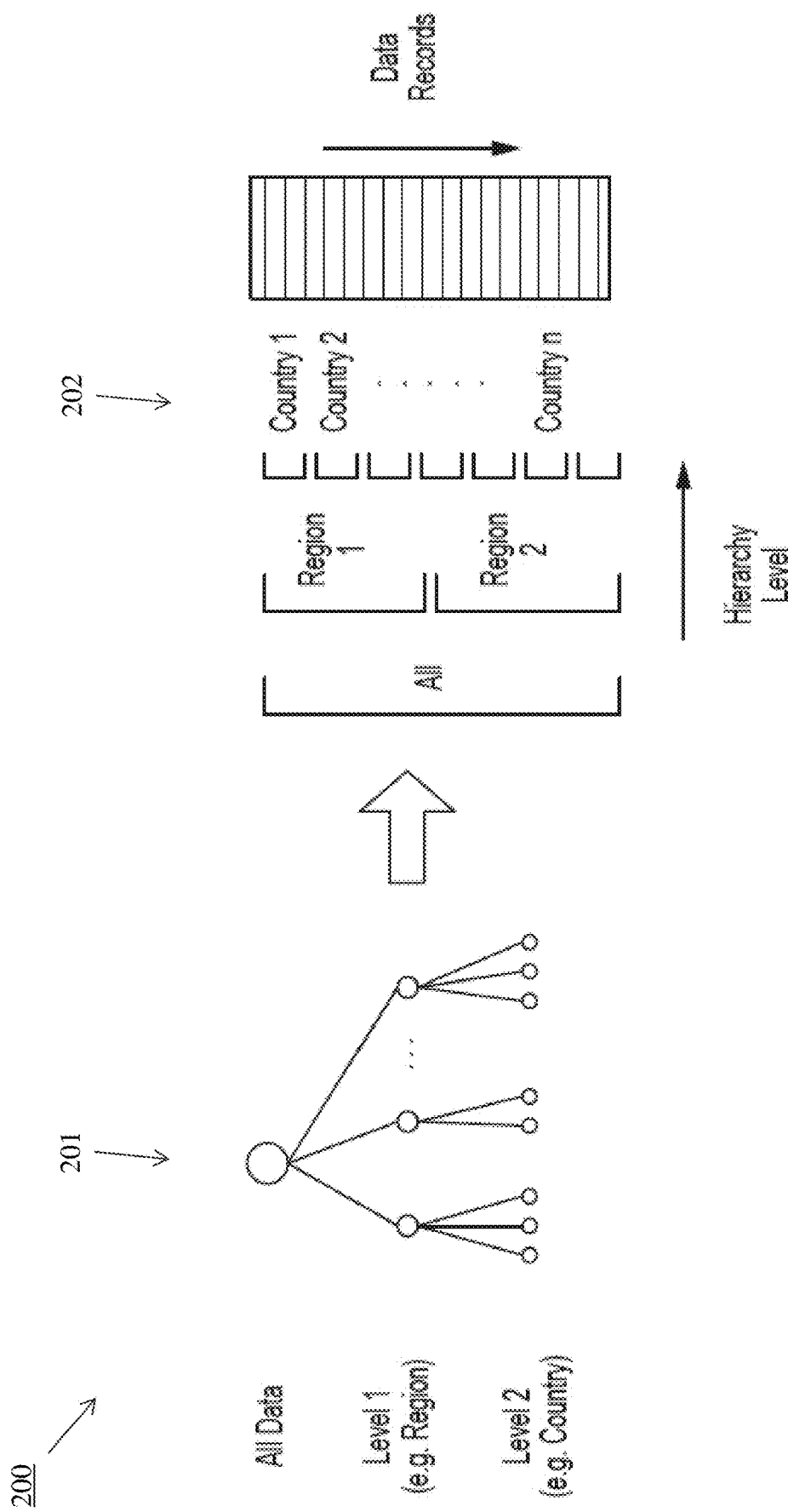
FIG. 2 depicts a diagram of an indexed aggregation data set.

FIG. 2 depicts a diagram 200 of a data dimension that has a natural hierarchical structure—e.g., geographical location, can be grouped into countries, then regions, then finally all the data. Such hierarchical nature may be used during processing to sort the data to support efficient aggregation along different levels of the hierarchy by different processes in parallel. A two-level hierarchy is depicted as an example in FIG. 2, but in principle any number of levels could be accommodated. An abstract representation of the hierarchical structure 201 and a translation into a sort order on the data 202 are depicted.

Figure 3:
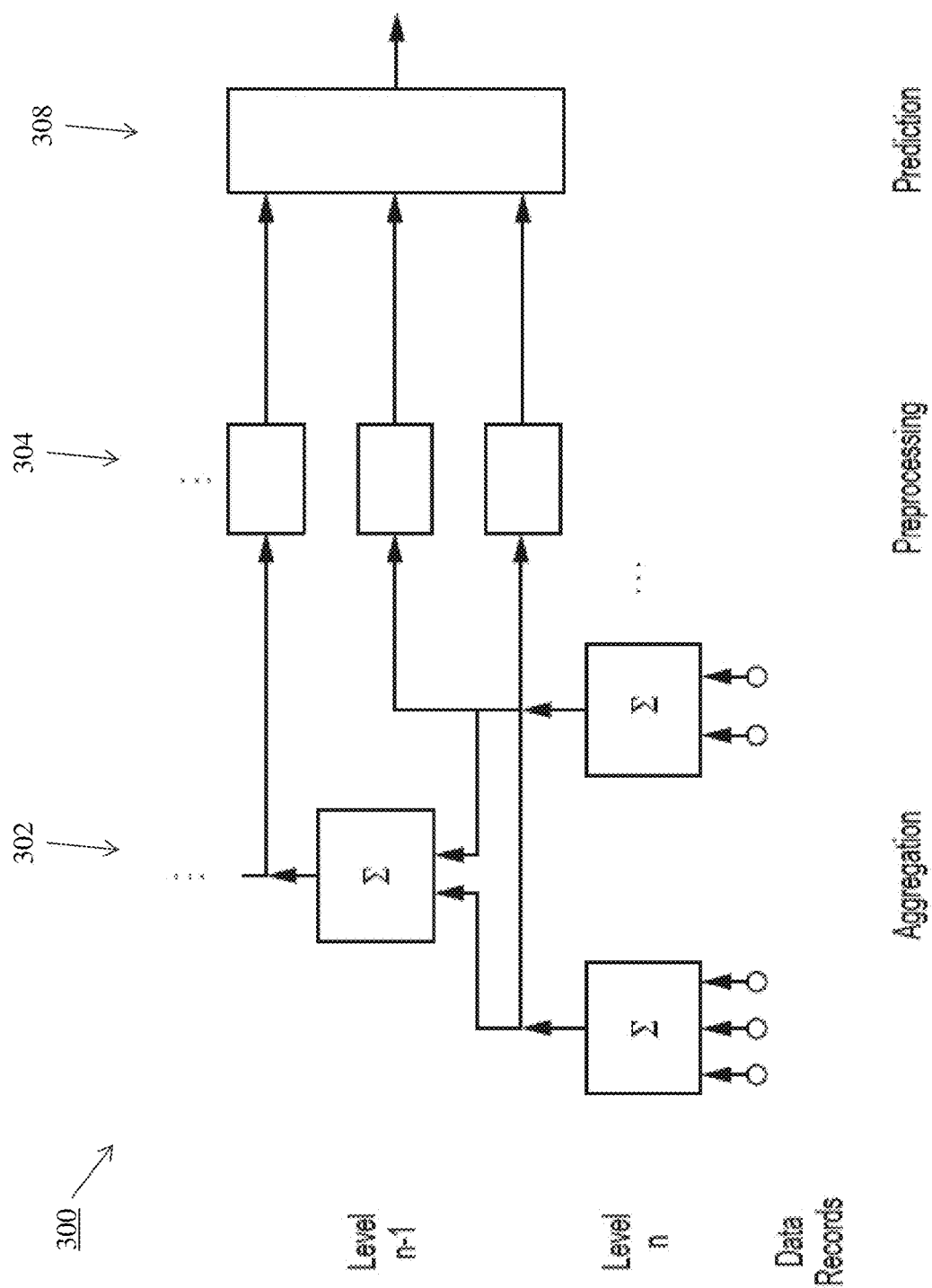
FIG. 3 depicts a diagram of intermediate aggregation for nowcasting.

FIG. 3 depicts an embodiment 300 comprising a pipelined architecture for prediction based on multi-level aggregation. Each box is a computational task, which may or may not be implemented as an independent process running on one or more computers. Aggregation tasks 302 may correspond to nodes in the hierarchy 201 depicted in FIG. 2. Each task aggregates its incoming data, sending the output to an aggregation node in the next higher level and simultaneously to a preprocessor 304 and ultimately to the prediction model 308. Final prediction flows out from the prediction model 308. This architecture allows concurrent execution of the tasks, giving time savings due to e.g., simultaneous execution of aggregation and preprocessing of the same data stream.

In some embodiments, the abstracted economic data produced by the methods and systems described herein can be automatically computer generated through a highly efficient computing architecture that facilitates simultaneous, independent multi-level aggregation of transaction-level records and enables the use of computing resources efficiently. Parallel aggregation of data records into aggregation groups, such as entities or countries can be forwarded on to secondary processing, such as for product types within countries and the like, while simultaneously being aggregated further into region-specific data sets that may also be secondarily processed independent of the country-specific secondary processing. Primary and secondary aggregation may be based on a hierarchical arrangement, such as port-country-region and the like. Each level of aggregation may be processed and stored in an indexed data structure that facilitates efficient access to intermediate aggregations. Therefore, as an example, secondary processing can access primary aggregation data via indexes that provide ready access to the primary processing/aggregation results without having to process the original source data. This can improve computing performance during a range of processing actions, including without limitation when new transaction sets are processed, and the like. Additionally, parallel aggregation can make use of distributed computing resources possible. This approach can further improve computer performance by allowing available computing resources to be used without regard for the physical location of the resources. In an example, transaction records for a first jurisdiction are processed by a first processor that is distinct from a second processor that is processing transaction records for a second jurisdiction. The resulting intermediate aggregated results may then be processed by a third distinct processor efficiently by relying on the indexed intermediate aggregation data structures. Other examples of embodiments that facilitate improvements in computer operation should be understood by the reader to be incorporated herein.

The data records operated on by the components of system 100 typically have three types of fields: date/time, aggregation keys, and one or more quantitative values that can be aggregated. An exemplary data record is shown below:

```
Record =
{
    date: 4/1/2018,
    transport_mode: Maritime,
    port: Shanghai,
    company: ABC Corp.,
    product_code: 123456
    weight: 1000 kg,
    volume: 2 TEU
}
```

The exemplary data record includes three aggregation keys: transport_mode, port, company, and product_code. Quantitative values that can be aggregated are weight and volume.

Each of the aggregation keys can be grouped into its own hierarchical system of successive aggregation. For example, a company belongs to an industry, which belongs to a sector. The system is configured to organize the data contained in the data record into a time series associated to each of these possible levels of aggregation and make that data available to predictive models that estimate a signal of interest.

In some embodiments, the system is configured via metadata defining possible aggregation keys and their organization into hierarchical levels. Exemplary metadata is shown below:

```
TreeMetadata =
{
    :transport mode,
    {region: {country: {port cluster: :port}}}},
    {sector: {industry: :company}},
    {product_category: {product_subcategory: : product_code}},
}
```

The metadata "TreeMetadata" defines a tree structure where each node is a parent of another node or a leaf node. For example, port_cluster is the parent of port, and sector is the parent of industry. In this case, the leaf nodes are transport_mode, port, company, and product_code. Each of these leaf nodes corresponds to a field defined in the exemplary data record above. In addition to leaf nodes, the metadata tree defines a number of aggregated nodes, such as region, industry, product_category, etc.

Additionally, and not shown above, each node in the metadata tree expands out to a number of possible values that are enumerated as part of the metadata structure. For example, possible values of region include Asia, North America, South America, etc. In this context, the region is referred to as the key and its value is one of the possible values for region.

Each node (e.g., key) of the tree is associated with three worker processes: Aggregator, Transformer, and Estimator.

Figure 4:
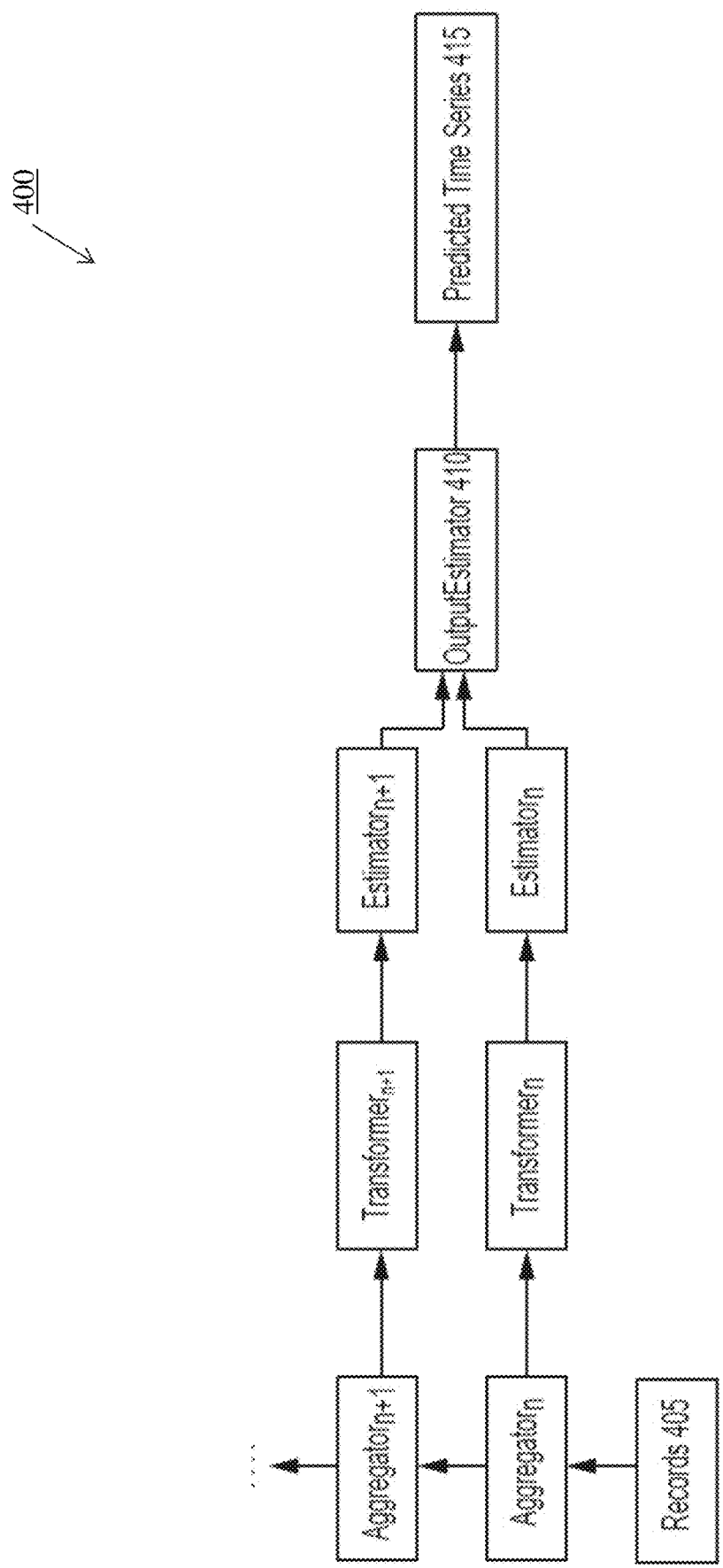
FIG. 4 is a diagram depicting the process workflow for predicting a time series of interest.

FIG. 4 is a diagram 400 depicting the process workflow for predicting a time series of interest, according to embodiments of this technology.

Each Aggregator process (e.g., $Aggregator_n$, $Aggregator_{n+1}$) takes data record inputs from its children and outputs aggregated records of the form {time:, key:, value1, value2, . . . }. There will be one such time-series output for each value of the node. Further, the inputs to the Aggregator for each leaf node are the individual data records (e.g., Records 405). Each Aggregator sends its output to its parent aggregator in the tree, if any, as well as to the next worker process, the Transformer. For example, $Aggregator_n$ sends its output to $Aggregator_{n+1}$ and to $Transformer_n$. As denoted by the ellipsis above $Aggregator_{n+1}$, some embodiments include one or more additional Aggregator/Transformer/Estimator processes.

Each Transformer process (e.g., $Transformer_n$, $Transformer_{n+1}$) applies one or more standard time series transformations to its input, including but not limited to differencing, conversion to percent change, convolutional filtering, etc. Each Transformer process outputs one time series for each transform to the next worker process, the Estimator. Each Estimator process (e.g., $Estimator_n$, $Estimator_{n+1}$) applies a machine learning or other predictive model to estimate the signal of interest from its inputs.

The aggregation, transformation, and estimation stages can be carried out simultaneously in parallel for non-dependent branches of the tree. Each parent Aggregator can begin to do work as its child Aggregators complete their output. Thus several pipelines of data flow are run in parallel: a pipeline for each tree node of Aggregator→Transformer→Estimator, and an aggregation pipeline running up the tree from each Aggregator to its parent.

An OutputEstimator process (e.g., OutputEstimator 410) takes as its input the Estimator scores from each tree node and applies a machine learning or ensemble learning technique to weight or select the individual Estimator scores in order to produce a single time series which is the model's full output (e.g., Predicted Time Series 415).

As will be understood, moving upward through the processes shown in diagram 400 corresponds to going up the metadata tree from child to parent. Additionally, and not shown, there are analogous pipelines for sibling non-dependent tree branches (e.g., one for the branch beginning with sector and another for region). These have no data flow between them, except for the common input from Records 405 and common output to OutputEstimator 410. These could be envisioned in diagram 400 as a third dimension emerging from the page, replicating the structure shown here.

For efficient retrieval and application (e.g., in an online prediction framework, or to reuse the Aggregator+Transformer outputs with different estimators trained on a different target signal) the collective output of the aggregators can be cached into a data structure of the form shown below:

```
CachedAggregateRecord = {
    agg_key: country,
    agg_value: China,
    date: 4/1/2018,
    weight: 10,000 kg
}
```

It should be understood that the fields and values shown are exemplary only. For example, the weight field could be substituted for any of the quantitative measures described above (e.g., volume).

In some embodiments, the cached data structure is indexed to allow efficient retrieval of these aggregated records by each Aggregator node. In some examples, a B-tree index on the (agg_key, agg_value) fields or a hash table with (agg_key, agg_value) as its keys is implemented. One of skill in the art will recognize that other indexing schemes may be employed without departing from the spirit of the technology described herein.

To control overfitting the resulting time series, the user of the system may opt to truncate the tree at a high level of aggregation, in which case all nodes would run the Aggregator process but only the top nodes would run the Transformer and Estimator.

Methods and systems described herein may facilitate generating multi-dimensional, coarse and/or macro level economic data for one or more jurisdictions from individual shipment transaction records that may be incomplete. Transaction records may lack information such as one or more parties (e.g., a buyer, a supplier, banker, insurer, and the like) to the transaction, may include incorrect shipment weight, may lack sufficient context to determine a country of origin directly, and the like. The economic data produced may address high level metrics such as commodity indexes, U.S. import and export census, jurisdiction-specific trade flows, entity-level transaction traffic, port-specific trade flows, changes in inventories, stockpiles, supply levels (e.g., U.S. oil stockpiles) and the like, supply chain health, U.S. trade deficit, industry performance indexes, and the like. The methods and systems described herein may produce such abstracted, high-level metrics with a high confidence level even when critical information, such as air freight transactions for the period being reported are not available.

In some embodiments, the abstracted economic data produced by the methods and systems described herein can be automatically computer generated through processing of individual shipment transaction records (e.g., customs records) with technologies described herein and in the incorporated '767 patent and '714 application that facilitate resolving entities, determining proper shipment weights and values, and the like as new records are available, such as on a daily or another availability basis.

The methods and systems for generating multi-dimensional nowcasts and/or longer range forecasts from individual data records may also include doing so from individual records that lack information such as one or more participants in the transaction, such as a buyer, seller, shipper, and the like. Jurisdiction, region, country, port, and other information that may be required to effectively use individual transactions may also be missing. By processing such transaction records through various methods and systems described herein and in the '767 patent and the '714 application, some portion of such missing information can be determined. Techniques described herein may include various entity resolution algorithms and the like described herein and in the '767 patent and the '714 application that may rely on, for example, similarity of information among records or to other information that may be accessible by a processor to determine one or more of the missing items of information. As entities are sometimes redacted from customs transaction records, so is shipment weight recorded in such records often misleading. Techniques described herein and in the '767 patent and the '714 application may adjust weight information from transaction records based on, for example, information detected elsewhere about more accurate product weight information. This may be combined with information such as container size, and the like to provide better and more accurate weight, value, and size information among others. This improved information may then be used during the aggregation and other processing steps described herein to produce the metrics, abstracted nowcast and forecast information and the like despite the apparent errors in the original transaction records. The various techniques described herein for correcting missing and/or inaccurate information may automatically be performed by the computing resources described herein, the performance of which is improved by the algorithms described herein.

Methods and systems described herein may facilitate generating multi-dimensional, coarse and/or macro level economic data for one or more entities, jurisdictions, geographic regions, ports, and the like for multiple modes of transportation even when individual shipment transaction records for some of the modes of transportation are not directly available. In an example, a census of economic trade metrics between two countries may incorporate transactions/shipments for both sea-freight and air-freight. However, with only raw sea-freight transaction data, machine learning models may be configured to provide such census metrics based on known relationships between sea and air freight allocation. Additionally, machine learning models may incorporate information about products, such as weight, volume, value, and the like to provide a refined adjustment of such allocation on a product or product-line basis. As an example, higher value, lighter weight electronic products (e.g., personal audio payers, cameras, phones, and the like) may be more likely to be shipped by airfreight than as ocean freight. The machine learning models that are applied to generate census and other economic or trade-related data may be configured to accept inputs such as product weight, size, and the like to automatically identify a suitable allocation of product shipments to air freight even without directly air freight transaction records. One such example may include using historical third-party census data as an input signal for the machine learning algorithms. Another example may include trending analysis. Over a time period where maritime shipments were 50% higher than an earlier period, one may expect air shipments to show similar increase, perhaps because both air and maritime shipments may be driven by similar economic factors. So long as there is a statistically determinable correlation between maritime and air shipments, air shipments may be estimated accurately. This relationship can be refined as described herein by processing that considers that some products are more likely to be shipped by air than sea, such as lighter more expensive or more time sensitive products.

Methods and systems described herein may facilitate generating multi-dimensional, coarse and/or macro level economic metrics for one or more jurisdictions from individual shipment transaction records may include aggregating transaction information for multiple dimensions from a single transaction record efficiently. A single transaction record may contribute to a plurality of distinct economic metrics and the like. In an example, one metric may be source country-based, another may be destination country-based, a third may be product sector-based, a fourth may be payment type-based (e.g., credit versus cash, source of credit, such as a bank, and the like). Other types of metrics may also be derivable from a single transaction record. One approach to collecting the information that contributes to several different metrics is to process a record through a single model that aggregates the information for the different metrics. While this may function acceptably at times, it presents a difficult challenge for maintenance of the model and the like. An alternate approach that is supported by the methods and systems described herein may include modeling each desired dimension in separate models that can be executed independently on the source data. Such an approach requires fewer variables to process in each model. For example, a single record can be aggregated into both a "country" macro signal or a "sector" macro signal. The first approach uses a single model that has both "country" and "sector" inputs/features, while the latter approach uses two models, separate country and sector models, each with a single time-series input/feature. Accordingly, the latter approach deals with fewer variables per model.

Modeling each desired dimension in separate models also enables independent processing a single record thereby increasing processing resource utilization, and the like. Such an approach also works cooperatively with other techniques described herein, such as efficiently indexed intermediate aggregated results processing. A single transaction record may be processed for both a country and a region. While two separate models may be configured to process the record independently for a country and for a region that includes the country, each country may be aggregated to an intermediate aggregated output that may be indexed as described herein and then further aggregated through a secondary processing activity that references the intermediate results for countries that make up the region. The flexibility of such methods and systems affords the system designer the option of utilizing availability of greater computing resources or fewer computing resources when intermediate aggregations are processed.

An exemplary embodiment of a census may include a total trade volume between the United States and China. The methods and systems described herein may facilitate generating the total trade volume early and often. Trade volume for a time period, such as most recent month, current month to date, and the like may be based on, among other things, an abstraction of a large quantity of individual transaction records. Through the machine learning, aggregation, and secondary metric generation processing steps described herein, as new records are made available, such as each week, day, and the like a nowcast of trade volume may be produced. Using such low-latency information may result in providing trade volume census at least daily if not more often. Without certain entity resolution, missing and wrong transaction data processing techniques described at least in the '767 patent and the '714 application, transaction data may not effectively yield a total trade with any reasonable degree of accuracy.

Further features and advantages of the methods and systems described herein can be illustrated in reference to several use cases of the technology.

Use Case 1—Total Trade Volume Between Two Countries

Trade volume statistics indicating the total trade volume between two countries (e.g., U.S. and China) are reported periodically, but typically include some amount of lag time. It can be useful to have a prediction of the total trade volume between two countries in advance of the reported statistics. Accordingly, the methods and systems described herein can be used for nowcasting the total trade volume between two countries.

Predicting trade volume statistics required transformation of raw data and distinct source data because the raw data available according to the trade volume disclosure was not useable for previously known nowcasts without transformation. As an example, while regional or country data for most product types might be able to be derived from available aggregated customs reports (although with substantive errors), deriving data for individual entities, at the least, is not possible without the entity resolution processing disclosed herein. Because of the need for using some level of aggregated report, previously known systems cannot provide the nowcasts as soon as, or update them as frequently as, the disclosed system using daily raw transaction data.

The disclosed system can produce nowcasts and forecasts for air freight-based activity without direct access to that transaction data. In one example, the source data for maritime freight is available, but information about air freight-based activity is missing or incomplete. The disclosed system can nonetheless predict data for both.

Existing predictive systems and methods use a simple assumption-based approach to predict activity. For example, for a given time period in which maritime shipments were 50% higher than an earlier period, air shipments are expected to show a similar increase based on an assumption that air shipments are driven by similar economic factors and therefore have a 1:1 relationship with maritime shipments. A prediction based on such an assumption is highly error prone error because some products are more likely to be shipped by air than sea (e.g., lighter more expensive products, shipping-time sensitive products, etc.).

Using granular data, the system described herein can provide a more accurate prediction of the relationship between maritime and air freight data, and of the air freight information in general. For example, the system determines a historical relationship between the previous predictive outcome data and census data that is broken down separately for maritime freight and air freight, and the system can use this breakdown of the data when predicting air freight. Machine learning methods can be used to find signal relationships in the data.

However, as mentioned above, certain products can be shipped by sea or by air. One such type of product is electronic components. Accordingly, in some embodiments, separate models are created for different products and corresponding signal relationships for those products. The models can be based on historical census data for each product. The corresponding census data can be used as a machine learning training set for the model. The total of electronic shipments and/or maritime-only electronic shipments is an example input to the trained model.

Using a variable-selection process that operates hierarchically (as described elsewhere herein), the model automatically determines when a separate model is created for a particular product. Specifically, the technology constructs both a series of product-specific models as well as an aggregated model that operates on all products. The different models are then compared, weighted, and selected using standard ensemble learning and feature selection techniques from the machine learning literature. In some embodiments, a user could configure the system to only build an aggregated product model and not individual product models.

One problem with using fine grain data is all of the intermediate steps required. Adding up the processing and management overhead associated with these steps gives a coarse result. Accordingly, the system described herein uses aggregation techniques to achieve an efficiency improvement by breaking the data up by certain dimensions, (e.g., country, product categories, companies, industries, specific ports, etc.), requiring fewer intermediate steps.

The technology described herein can provide features to further support the aggregation operations. In some embodiments, the data is indexed by the dimension(s) of interest prior to aggregation, and the indexed representation of the data is stored. In addition, many data aggregations are hierarchical. One such example is a regional relationship (e.g., "the far east" is associated with a particular set of countries). In some embodiments, the system can re-use lower level aggregated signals (e.g., country-specific) when generating a regional aggregation. The hierarchical structure can be adjusted to manage the number of intermediate aggregations created, to adjust the elements available for re-use (e.g., country data, country by industry, etc.), to adjust the elements available for cross-correlation, and/or to provide defined data sets for parallel processing (e.g., by processing operations required, communication bandwidth required, and/or memory storage required).

In some embodiments, the system achieves further efficiency using parallelism. For example, the system can perform its computation of aggregation of each level of hierarchy (e.g., by country) in parallel then take the totals to get the next level of hierarchy.

For some applications, it is desirable to estimate values of time series of interest at current time (which are difficult to measure as they occur) or in the future (which are impossible to measure, as they have not occurred yet) based around other data. An embodiment of the described system can be configured for nowcasting and forecasting using a time series of interest, such as international trade data. In particular, the system can use transaction level trade data to predict other time series (indices, etc.) of interest. In some embodiments, the predicted time series are the absolute value, growth/decrease, and/or other derived measures of one or more of commodity indices (e.g., oil imports/exports, car imports/exports), aggregate trade indices (e.g., TEU volumes, import/export total monetary values, trade deficits), aggregate country level indicators, and other financial indices known in the industry.

In some embodiments, the transaction-level time series data is low latency data that describes a related flow of interest. Example transaction-level data includes shipment data and derivatives thereof, which have relatively low latency. The system uses the low latency data to estimate and/or forecast the higher latency data. For example, U.S. import transaction-level shipment data can be considered a low-latency predictor as it is updated daily, and only lags actual shipments by approximately one week. In addition to being low-latency and high-frequency, this data is highly granular, reflecting each individual shipment transaction. In contrast, U.S. census data on trade flows can be considered a higher latency predictor as it is published monthly, with a one month delay. This data has very low granularity compared with the transaction-level data, as it is aggregated over potentially millions of individual shipment transactions.

In some embodiments, the predictive technology described herein uses historical time series values of the desired index or flow of interest in combination with other data sources. For example, the technology can use data from a time series such as information about parties or countries involved, products, volumes, counts, weights of the trade flows of the time series, time of year of the trade flows of the time series, auto-correlation of these flows of interest (e.g., computing the correlation coefficient between a time series and itself at a lag of one month), etc.

Other data sources may include lower latency data (e.g., processed transaction level shipment data as identified above). In some embodiments, the technology operates on all characteristics used for the historical time series of flow of interest. In some embodiments, the other data sources include information on the nodes or parties involved (e.g., corporate office and facility locations, historical products traded, geolocation data about a company, etc.).

Using the data sources described above, the technology is able to leverage trade data processing and enrichment technology to accommodate biased or missing data. In some embodiments, data can be used by the technology for entity resolution/identification, weight correction, product classification, detecting missing observations, and country classification and geolocation based on unstructured addresses.

The technology also provides certain derived features. In some embodiments, the technology provides measures of autocorrelation between time series. In some embodiments, the technology employs composite features combining interactions and dimensionality reduction transformations of above data. For example, a different influence (e.g., distinct signal relationship) can be determined based on trade flow from China if that flow is above or below a given level. In some embodiments, the signal relationship is adjusted based on one or more of volume, value, weight, or other thresholds.

As is apparent, the present technology has wide applicability in estimating the value of macroeconomic indicators (e.g., census, commodity indexes, etc.) before they are released or before the occurrence of the underlying events on which the indicators are based. Accordingly, use of the systems and methods described herein can advantageously allow decisions relating to such events as finance and investment, corporate and country planning, and commencement of production runs to be made earlier than was previously possible with existing predictive technologies.

As one example, an estimate of the U.S. car imports as reported by the census department (e.g., high latency data) can be generated in advance of their release, using U.S. transaction level import data (e.g., low latency data). In one example, the system estimates the U.S. car imports data at the current date in advance of the delayed release of U.S. car imports statistics. For example, an aggregate value reflecting imports that have already occurred is estimated based on data directly related to those imports, before the aggregate value is publicly released. In another example, a future value of the U.S. car imports data is estimated. For example, trend analysis if run on current auto import (actual or estimated data) to predict future auto imports. This is a fundamentally distinct estimate from present-time estimation, and while the same source data could be used, distinct signal relationships are extracted from that data for future value estimation.

In some embodiments, trade flow of a given entity or rollup (also referred to herein as a "node") in international trade for the current period, or a future period, can be estimated before its related statistics are officially released. For example, traffic statistics can be estimated for nodes such as a given company, a given port of trade, the coast of a country, a product in commerce, or other arbitrary node in advance of the official release and availability of these statistics.

The current technology can be applied to several other applications. In some embodiments, trade flow statistics can be estimated for a current or future period of time for a given node even in the presence of biased or redacted source data. For example, granular data such as certain U.S. import transaction level data can be redacted to obscure information such as corporate entity names and origin country of trade. In some embodiments, records pertaining to trade in certain strategically important products are missing entirely, or trade with politically sensitive countries. It is also common for the granular data to contain erroneous or inaccurate values for certain data (e.g., shipment weight). Further, as discussed above, it can be desirable to predict a macro signal that covers maritime and air transport, but trade transaction records may only provide information related to maritime transport. Reconstructing the maritime signal alone from the transaction records would yield a macro signal that is biased downward in the sense that it systematically misses the contribution by the air component. The present technology mitigates against introducing bias in the macro signal by discovering components of the maritime signal that are highly correlated with, and therefore predictive of, the missing air freight signal. The resulting macro signal is adjusted (e.g., upward) to avoid introducing a bias in the resulting macro signal. Accordingly, the present technology can nonetheless estimate a "true value" for the trade flow data using reference data having biased or redacted transaction level records.

The present technology is further configured to accommodate records having several different formats or layouts, or that employ arbitrary segmentation of the overall time series of interest (e.g., by country, by product, by port, by weight range, etc.). In this way, the technology is able to operate using arbitrary time series or derived measures thereof. For example, flow in a given time period (say, shipments in a given month, shipments of shoes in a given month for company X).

In some embodiments, the systems and methods described herein estimate stockpile data and/or supply levels such as commodity stockpiles for a particular node. For example, U.S. oil stockpiles can be estimated based on U.S. Imports data and corresponding data for Mexico. In some embodiments, the financial health of a company is determined by estimating current revenue based on transaction level trade data. In some embodiments, the health of a supply chain is determined by estimating flows in supply chains before they are reported, for example, in earnings reports.

Advantageously, the present technology is configured to enable incorporation of various prediction and regression algorithms into the overall hierarchical time series decomposition architecture described herein. In some embodiments, the technology incorporates one or more of the following algorithms or techniques: linear regression, regularized regression, a support vector machine ("SVM"), tree-based methods, neural nets, determinations of time domain distributions (e.g., frequency data, cyclical/periodic effects), determinations of convergence in multiple dimensions to enhance confidence (e.g., matching weights and values; regions and individual countries; shipments by entity; etc.), etc. In some embodiments, the prediction algorithm(s) implement training validation appropriate to time series data, such as incorporation of auto-correlation and data validation that does not allow "leaking" of information across groups/folds occurring close in time.

A further advantage provided by the hierarchical time series decomposition architecture of the present technology is the speed at which predictive operations can be completed. Leveraging the in-place computation infrastructure described herein enables fast and efficient computation of predictions. For example, the described technology includes indices allowing for rapid querying of new data, performant machine-learning algorithms, and dynamic load balancing algorithms. In particular, the systems and methods are configured to explore a large space of possible aggregations of the transaction-level data along different dimensions in order to identify those that are predictive of the target. The systems and methods are further configured to derive coarse-grained predictions from granular transaction-level data.

The technology described herein enables efficient aggregation along many dimensions simultaneously (e.g., country of the shipment, product shipped, company involved) by building a sorted index on one or more, or all, dimensions of interest. In most cases, the aggregation dimension of interest has a natural hierarchical structure. For example, geographical locations can be grouped into countries and then regions, products can be grouped into a hierarchy of increasingly general categories, and companies can be grouped into industries and sectors. Each level of the hierarchy can separately be of interest as a predictive signal for the prediction model.

The technology exploits this hierarchical structure to speed up aggregation operations. For example, the lowest level of the hierarchy is aggregated first (e.g., the data is aggregated within each country). The results are stored and fed as input features to the prediction model employed, as well as to the next level of the aggregation hierarchy. At the next level of aggregation, the results from the previous level are aggregated, giving much greater efficiency than directly aggregating the raw data again. Further, aggregations at each level can be performed in parallel for even greater performance. For example, each country's signal can be aggregated in an independent process, and the results can be collected together as input to a subsequent process that performs the regional aggregation.

In some embodiments, the speed of predictive operations by the system is further enhanced by distributing modeling tasks against multiple processing cores and/or multiple server devices with the goal of modeling and serving up predictions for multiple indices at the same time.

According to embodiments of the technology, multiple targeted time series of interest can be modeled at the same time to benefit from correlation between them. The described method of predicting coarse-grained target data from granular, transaction-level data provides an enhancement over existing predictive systems and methods, as the described technology has access to signals that explain the relationship between the target variables. Namely, there is visibility into the targets' common origin in individual shipment transactions. As an illustrative example of this "Multi-Output Regression," models can be created that model trade with Country A and flow of trade in Good Z at the same time. For example, trade with China and trade in electronics can be modeled at the same time. The resulting model has access to data related to individual shipment transactions including trade with China of electronics products, trade with China of non-electronics products, trade outside of China of electronics products, and trade outside of China of non-electronics products. The model learns the appropriate weighting of all these sub-categories that predicts the target signals.

Use Case 2—Predicting the U.S. Trade Deficit

An exemplary method includes downloading a prior month's total seaborne imports, plus selected additional granular data (e.g., 10 key countries and 6 key sectors) to create an initial view on what is driving imports. This downloaded data can be analyzed to produce an initial trade deficit report. Total elapsed time to prepare this initial report using this latent data is around 3 hours. Continuing the example, around the $15^{th}$ of the month, a refresh of data from the $10^{th}$ of the month is performed to catch late-delivered data, and/or to consider the impact from Bureau of Labor Statistics' pricing data. Continuing the example, around the $23^{rd}$ of the month the data is again refreshed (e.g., to consider export data from key U.S. ports) as a final preview for the trade deficit estimate. In some embodiments, operations of the exemplary method are improved by the use of signal relationship information to configure key countries, sectors, and/or ports. In some embodiments, operations of the exemplary method are improved by pre-indexing the granular data as described herein. The exemplary method provides prediction sets (e.g., output values 108) over the course of the month, each one having more information and/or a higher confidence associated with the accuracy of the prediction set than the last. In some embodiments, each of the output values 108 can be provided earlier than previously known reporting information (e.g., high latency census reporting), provided with consumption of fewer resources, and/or provided with a higher confidence and/or accuracy than previously available.

Further exemplary nowcasting techniques described herein utilize low latency individual customs transaction data that is not limited to 10 key countries and 6 key sectors, and/or that include key parameters (e.g., countries, sectors, regions, etc.) that have a high confidence signal relationship value with the output value (e.g., total seaborne imports). Therefore, by processing the transaction data and indexing and/or aggregating it across multiple dimensions, import and export data for a number of countries, sectors, ports, and the like can be prepared frequently, such as daily. Therefore, a trade deficit report could be generated each day for any prior period, such as the last 30 days, last calendar month, year to date, and the like. In this example, a trade deficit for the prior month could be automatically produced, with higher accuracy, and with substantively less computer utilization on the last day of the prior month, the first day of the new month and the like.

Use Case 3—Tracking Industry Performance Indices

In a further exemplary embodiment, once an industry standard index is identified, existing methods search harmonized tariff system ("HTS") codes and/or keywords to identify the best cluster of queries. This search is a lengthy (6 to 10 hours typically) manual process by which an analyst leverages domain knowledge to select filtered time series believed likely to be related to the signal of interest. The analysis is re-run over the course of three to four months to demonstrate validity. The process can then be updated once per month. Certain operations of this existing method are improved by the use of signal relationship information to configure HTS codes, keywords, and/or other system parameters, by pre-indexing of granular data, and/or by other systems and operations described herein. Further, the described method enhances the existing method by automating the search process by efficiently decomposing the data into many different time series along many different dimensions, and using machine learning to select or combine them in a way that optimally predicts the signal of interest.

The new method described herein can further include testing a number of signal relationship scenarios to match the prior data. For example, this method can provide a forward-looking output value 108 (e.g., the end of the current month, the next future month, next seasonal data, the coming year, etc.). Additionally, the method can provide an updated output value 108 corresponding to present time, at any selected time, and/or upon request. Further operations of the new method include sensitivity analysis to determine the effect of missing data (e.g., one or more data sets are reported late and/or have errors indicating potential exclusion from the analysis), to determine signal relationship elements that warrant additional processing resources for refinement of the model, and/or to determine change in sensitivity over time (e.g., for cyclical, seasonal, or threshold driven adjustments to the signal relationships).

Additionally or alternatively, this new method can automate analysis of a number of query clusters to determine the most effective signal relationships, and can re-group query clusters to determine if a better set of clustered data is available for determining certain desired output values 108. For example, a number of potential raw data inputs may be considered (e.g., top-10 volume, top-10 value, top-10 quantity of shipments, each by country, region, entity, port, industry, and/or product, and/or randomized or selected mixtures of these, etc.). Where members of one potential raw data input are determined to have predictive value, the query clusters can be adjusted to include more predictive members. The use of a "top-10" grouping is a non-limiting example, and any number of members of a group, and/or all members of a group, may be utilized. In certain embodiments, a statistically significant number of members of a group may be selected (e.g., depending upon the group size, and/or the size of individual members relative to the group), and/or certain members or groups may be automatically included to ensure consideration (e.g., each one of a selected group of countries may be included in a query cluster by design).

Use Case 4—Real-Time Tracking of Corporate Performance for Risk Management Purposes In another exemplary method, an event is identified, such as based on a news-flow either related to a specific event, entity, or its adjacencies (e.g., similar companies or industries). An example might be a report of higher than expected U.S. trade deficit with a particular country for a particular sector, changing of expected or reported volumes, sales, and/or inventories, information from an SEC filing or similar document, and the like. The exemplary method includes HTS-code or keyword searching for aggregate performance plus country, counterparty, and HTS exposure. A further example includes performing the searching based on signal relationships determined throughout the data set, and/or based upon signal relationships determined in response to an event of the type identified. The typical elapsed time to perform the method is 3 hours per case. This process results in performance tracking that provides enhanced information over a previously known update of information in response to the news event. Additionally or alternatively, signal relationships determined in response to an event type can be used to identify an event that is likely to have occurred but has not yet been reported. For example, where a signal consistent with an event has been identified based on the data, but the event has not yet been reported.

Previously known techniques include a standard update rate such as monthly or based upon an observed emerging event. The methodology described herein provides for a high-rate, continuous, and/or selectable update rate, an enhanced prediction set utilizing the signal relationships and/or signal relationships modified in response to the event, and/or predicting that an event (e.g., a specific event, or a generalized event consistent with a signal in the data) has occurred, and potentially triggering an updated prediction value before an ordinarily scheduled prediction value update.

The nowcasting systems and methods disclosed herein utilize daily accumulations of customs or other transaction records, and/or further information from other record types which may have distinct and/or variable delay times, and determine nowcasts (output values 108) that have stepped outside of a normal or expected range. This can be automatically determined through applying computer machine learning and other automated anomaly detection techniques to the granular transaction data. Through the multi-dimensional aggregation techniques and/or signal relationship processing and utilization techniques, as described herein, performance metrics can be produced at selected intervals, such as, for example, continuously and/or daily as the granular data is available rather than relying on high-lag summary data, and/or signal indicators within a data set that may not be correlative any longer, as an after-the-fact activity based on a news report. Effectively, signals that may indicate a change in performance, that might otherwise only be visible through a news report, can be determined before the release of the news report, with greater accuracy and confidence, and/or with lower resource utilization such as processing time, processing cycles, communication bandwidth, and/or memory utilization.

Figure 5A:
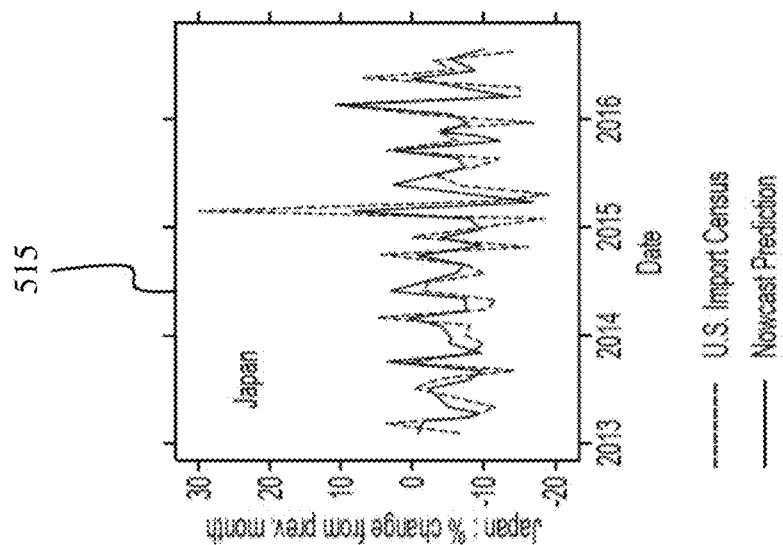
FIG. 5A depicts a graph of the percent change in U.S. imports from China based on U.S. census data and a graph of the predicted percent change using nowcasting techniques according to embodiments of the technology described herein.
Figure 5B:
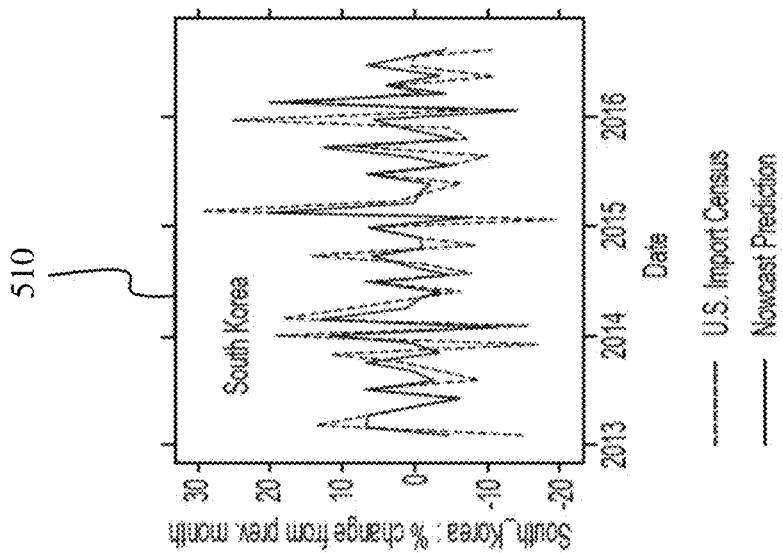
FIG. 5B depicts a graph of the percent change in U.S. imports from South Korea based on U.S. census data and a graph of the predicted percent change using nowcasting techniques according to embodiments of the technology described herein.
Figure 5C:
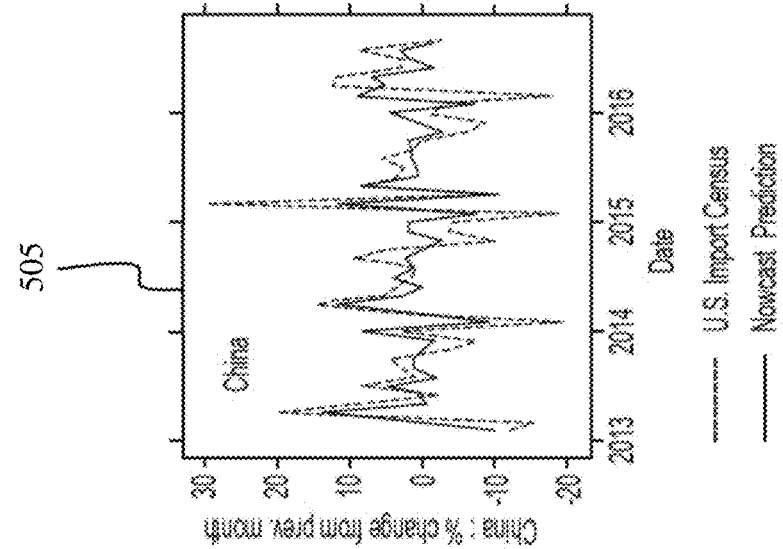
FIG. 5C depicts a graph of the percent change in U.S. imports from Japan based on U.S. census data and a graph of the predicted percent change using nowcasting techniques according to embodiments of the technology described herein.

FIG. 5A, FIG. 5B, and FIG. 5C depict graphs 505, 510, and 515, respectively, including a curve denoting the percent change over previous month for U.S. imports from a particular country (e.g., China, South Korea, and Japan, respectively) based on U.S. census data. FIG. 5A, FIG. 5B, and FIG. 5C each also depict a curve representing the predicted percent change for a particular country using nowcasting techniques according to embodiments of the technology described herein. In each graph, the curve denoting the nowcast-predicted import data closely tracks the curve denoting the actual import data obtained from the U.S. census.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g., where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure. An example computing device includes a computer of any type, capable to access instructions stored in communication thereto such as upon a non-transient computer.

References herein to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A method, comprising:
defining, by a computing device, a signal relationship between a granular data value and a target data value, wherein at least a portion of the granular data value corresponds to a granular latency value that is smaller than a target data latency value corresponding to the target data value;
interpreting, by the computing device, granular data corresponding to the granular data value, including predicting one or more missing values in the granular data by:
executing a trained natural language processing (NLP) model using the granular data as input to generate a predicted classification for the granular data,
determining one or more other sets of granular data associated with the predicted classification,
associating the granular data with one of the other sets of granular data when a similarity value between a first mathematical vector corresponding to the granular data and a second mathematical vector corresponding to one of the other sets of granular data is greater than a threshold similarity value, and
determining predicted values for the one or more missing values in the granular data based upon the predicted classification for the granular data and the association between the granular data and the one of the other sets of granular data;
aggregating, by the computing device, the granular data in response to the signal relationship;
estimating, by the computing device, a value of the target data value for a selected time reference by:
applying a time series transformation to the granular data based on the selected time reference, wherein applying the time series transformation comprises performing a differencing operation; and
applying a machine learning model to an output of the time series transformation, wherein applying the machine learning model comprises performing a tree-based method;
determining, by the computing device, a nowcasting prediction of the target data value based on the estimated value of the target data value;
generating, by the computing device, a push notification comprising the nowcasting prediction of the target data value and transmitting the push notification to a mobile device;
activating, by the mobile device, a graphical user interface of the mobile device in response to waking the mobile device from a sleep mode based upon receipt of the push notification; and
displaying, by the graphical user interface of the mobile device, the push notification to a user of the mobile device.

2. The method of claim 1, wherein aggregating comprises aggregating the granular data value in a hierarchical format.

3. The method of claim 2, further comprising processing the granular data prior to the aggregating, wherein the processing further comprises indexing the granular data in response to the hierarchical format.

4. The method of claim 2, further comprising processing the granular data prior to the aggregating, wherein the processing further comprises indexing the granular data in response to the signal relationship.

5. The method of claim 2, further comprising processing the granular data prior to the aggregating, wherein the processing further comprises verifying the signal relationship in response to at least one sub-aggregation developed during the aggregating.

6. The method of claim 2, further comprising processing the granular data prior to the aggregating, wherein the processing comprises correcting erroneous data in the granular data.

7. The method of claim 1 wherein applying the time series transformation further comprises performing one or more of a conversion to percent change, convolutional filtering, trend regression, cycle regression, a power transform, and a smoothing operation.

8. The method of claim 1 wherein applying the machine learning model further comprises performing one or more of a linear regression, a regularized regression, applying a support vector machine, applying a neural network, determining a time domain distribution, and determining a convergence in multiple dimensions.

9. The method of claim 1 further comprising identifying a hierarchical relationship between at least two data fields of the granular data.

10. The method of claim 9 wherein identifying the hierarchical relationship further comprises receiving a data structure defining the hierarchical relationship between the at least two data fields of the granular data.

11. The method of claim 1 further comprising weighting a value of the target data value for the selected time reference.

12. The method of claim 11 wherein weighting comprises performing one or more of a linear regression, a regularized regression, applying a support vector machine, a tree-based method, applying a neural network, determining a time domain distribution, and determining a convergence in multiple dimensions.

13. The method of claim 1 further comprising correlating a change in at least one data field of the granular data with a change in the target data value.

14. The method of claim 1 further comprising generating a cached data structure based on an aggregation of the granular data, the cached data structure comprising a plurality of data fields extracted from the aggregation of the granular data.

15. The method of claim 14 further comprising generating an index based on at least two data fields extracted from the aggregation of the granular data.

16. The method of claim 1 further comprising determining feedback data in response to determining the nowcasting prediction of the target data value.

17. The method of claim 16 wherein the feedback data comprises a census report.

18. The method of claim 16 further comprising updating the signal relationship in response to the determined feedback data.

19. The method of claim 1 further comprising providing access to open an application on the user device to access the nowcasting prediction of the target data value.

* * * * *